United States Patent [19]
Beebe et al.

[11] Patent Number: 5,826,429
[45] Date of Patent: Oct. 27, 1998

[54] CATALYTIC COMBUSTOR WITH LEAN DIRECT INJECTION OF GAS FUEL FOR LOW EMISSIONS COMBUSTION AND METHODS OF OPERATION

[75] Inventors: Kenneth W. Beebe, Galway; Stephen L. Hung, Waterford; Martin B. Cutrone, Niskayuna, all of N.Y.

[73] Assignee: General Electric Co., Schenectady, N.Y.

[21] Appl. No.: 575,809

[22] Filed: Dec. 22, 1995

[51] Int. Cl.[6] .................................. F02C 1/00; F02G 3/00
[52] U.S. Cl. .................................. 60/723; 60/733; 60/738; 60/739; 60/746
[58] Field of Search ........................... 60/261, 723, 733, 60/738, 739, 740, 746

[56] References Cited

U.S. PATENT DOCUMENTS

| | | | |
|---|---|---|---|
| 2,944,388 | 7/1960 | Bayer | 60/261 |
| 3,928,961 | 12/1975 | Pfefferle . | |
| 4,730,453 | 3/1988 | Benoist et al. | 60/261 |
| 4,794,753 | 1/1989 | Beebe . | |
| 4,845,952 | 7/1989 | Beebe . | |
| 5,003,768 | 4/1991 | Kappler et al. | 60/723 |
| 5,161,366 | 11/1992 | Beebe | 60/723 |
| 5,395,235 | 3/1995 | Lan-Sun Hung | 60/723 |

*Primary Examiner*—Charles G. Freay
*Attorney, Agent, or Firm*—Nixon & Vanderhye

[57] ABSTRACT

A combustor for a gas turbine includes a diffusion flame combustion zone, a catalytic combustion zone and a post-catalytic combustion zone. At start-up or low-load levels, fuel and compressor discharge air are supplied to the diffusion flame combustion zone to provide combustion products for the turbine. At mid-range operating conditions, the products of combustion from the diffusion flame combustion zone are mixed with additional hydrocarbon fuel for combustion in the presence of a catalyst in the catalytic combustion zone. Because the fuel/air mixture in the catalytic reactor bed is lean, the combustion reaction temperature is too low to produce thermal $NO_x$. Under high-load conditions, a lean direct injection of fuel/air is provided in a post-catalytic combustion zone where auto ignition occurs with the reactions going to completion in the transition between the combustor and turbine section. In the post-catalytic combustion zone, the combustion temperature is low and the residence time in the transition piece is short, hence minimizing thermal $NO_x$.

7 Claims, 3 Drawing Sheets

5,826,429

CATALYTIC COMBUSTOR WITH LEAN DIRECT INJECTION OF GAS FUEL FOR LOW EMISSIONS COMBUSTION AND METHODS OF OPERATION

TECHNICAL FIELD

The present invention relates to combustors for gas turbines and particularly relates to a catalytic combustor with lean direct injection of gas fuel downstream of the catalytic combustion zone for low emissions combustion and to methods of operating the combustor.

BACKGROUND

Gas turbine manufacturers are currently involved in research and engineering programs to produce new gas turbines which will operate at high efficiency without producing undesirable air polluting emissions. The primary air polluting emissions typically produced by gas turbines burning conventional hydrocarbon fuels are oxides of nitrogen, carbon monoxide and unburned hydrocarbons. It is well known that oxidation of molecular nitrogen in air breathing engines is highly dependent upon the maximum hot gas temperature in the combustion system reaction zone and the residence time for the reactants at the highest temperatures reached within the combustor. The level of thermal $NO_x$ formation is minimized by maintaining the reaction zone temperature below the level at which thermal $NO_x$ is formed or by maintaining an extremely short residence time at high temperature such that there is insufficient time for $NO_x$ formation reactions to progress.

One method of controlling the temperature of the reaction zone of a combustor below the level at which thermal $NO_x$ is formed is to premix fuel and air to a lean mixture prior to combustion. The thermal mass of the excess air present in the reaction zone of a lean premixed combustor absorbs heat and reduces the temperature rise of the products of combustion to a level where thermal $NO_x$ is not formed. A problem associated with this method of reducing $NO_x$ formation is that the fuel/air mixture strength must be reduced to a level close to the lean limit of flammability for most hydrocarbon fuels. As a consequence, lean premixed combustors tend to be less stable than more conventional diffusion flame combustors and produce increased levels of carbon monoxide and unburned hydrocarbons due to partial quenching of the chemical reactions. These problems may be minimized by the use of a catalytic reactor which promotes fuel oxidation at low temperature without promoting the oxidation of molecular nitrogen.

A problem with the technology for most advanced, high efficiency heavy duty industrial gas turbines is that the required temperature of the products of combustion at the combustor exit/first stage turbine inlet at maximum load is so high that the catalyst overheats when passing the fuel/air mixture necessary to achieve this temperature, thereby limiting the life of the catalyst. In addition, the required combustor exit temperature for these machines may exceed the thermal $NO_x$ formation threshold temperature, resulting in significant $NO_x$ formation even though the fuel and air are premixed lean. The problem to be solved is to obtain combustor exit temperatures high enough to operate advanced high efficiency heavy duty gas turbines at maximum load without overheating the catalytic reactor and/or forming a significant amount of thermal $NO_x$ even though fuel and air are premixed lean.

Catalytic combustion of lean premixed hydrocarbon fuels and air has previously been shown to be a very attractive method of minimizing air pollutant levels for gas turbine combustors. This technology is disclosed in U.S. Pat. No. 3,928,961. Lean direct injection of hydrocarbon fuel and air has also been shown to be an effective method for reducing $NO_x$ levels for gas turbine combustion systems although not as effective as catalytic combustion. The present invention adopts these two technologies, i.e., catalytic combustion and lean direct injection, in a novel and unique manner in order to achieve extremely low air pollutant emissions levels, particularly oxides of nitrogen, when operating an advanced, high efficiency, heavy duty industrial gas turbine at high load.

DISCLOSURE OF THE INVENTION

In accordance with the present invention, catalytically-supported thermal combustion of a lean mixture of hydrocarbon fuel and air is combined with lean direct injection of hydrocarbon fuel and air into a post-catalytic reaction zone to achieve extremely low levels of emissions of oxides of nitrogen at the high combustor exit temperatures required by advanced heavy-duty industrial gas turbines. A catalytic reactor is used to initiate and sustain combustion of a mixture of hydrocarbon fuel and air which is very lean and has an adiabatic flame temperature below the temperature that would result in any substantial thermal $NO_x$ formation. After this low temperature reaction has been completed in a post-catalytic reaction zone, additional fuel and air are injected into the products of combustion in order to raise the temperature of the mixture to the level required to operate an advanced, high efficiency, heavy-duty industrial gas turbine, i.e., to raise the combustor exit/first stage inlet temperature to the required level. Formation of nitrogen oxides in the region after post-catalytic fuel injection is minimized by partial premixing of fuel and air prior to ignition (i.e., lean direct injection) and by minimizing the residence time of the combustion products between post-catalytic fuel injection and the turbine first-stage inlet. Moreover, the catalytic reactor is operated with a fuel/air mixture which is lean enough to ensure that the catalytic reactor life is not reduced by over-temperature operation and/or flashback of gas phase homogeneous combustion reactions into the catalytic reactor or upstream fuel/air preparation systems for catalytic combustion.

In a preferred embodiment according to the present invention, there is provided a combustor for a gas turbine, comprising a combustor housing for combusting fuel and confining a stream of combustion products for flow in a downstream direction, the combustion housing having (i) a diffusion flame combustion zone including a fuel nozzle for introducing fuel into the zone and air admission openings for introducing air into the zone; (ii) a catalytic combustion zone downstream of the diffusion flame combustion zone and including a catalytic reactor bed and a fuel inlet for supplying fuel thereto; and (iii) a post-catalytic combustion zone downstream of the catalytic combustion zone including a nozzle for flowing a lean fuel/air mixture into the post-catalytic combustion zone.

In a further preferred embodiment according to the present invention, there is provided a method of operating a combustor for a gas turbine under low, mid-range and high-load conditions, comprising the steps of (i) under low load conditions, flowing fuel and air into a diffusion flame combustion zone and causing combustion of the fuel in the zone to generate combustion products for flow in a direction downstream from the diffusion flow combustion zone, (ii) under mid-range load conditions, supplying fuel to and mixing the fuel with the products of combustion flowing downstream from the diffusion flame combustion zone, causing combustion of the mixture in the presence of a catalyst in a catalytic combustion zone downstream of the diffusion flame combustion zone and continuing flow of combustion products therefrom in a downstream direction and (iii) under high-load conditions, introducing fuel and air downstream of the catalytic combustion zone and into a post-catalytic combustion zone for mixing with combustion products from the diffusion flame combustion zone and the catalytic combustion zone and causing combustion of the mixture in the post-catalytic combustion zone.

In a still further preferred embodiment according to the present invention, there is provided a method of operating a combustor for a gas turbine, comprising the steps of supplying a fuel and air mixture to a catalytic reactor bed, causing combustion of the mixture in the presence of a catalyst in a catalytic combustion zone and flowing combustion products therefrom in a downstream direction, introducing fuel and air downstream of the catalytic combustion zone and into a post-catalytic combustion zone for mixing with combustion products from the catalytic combustion zone and causing combustion of the fuel and air introduced downstream of the catalytic combustion zone and the combustion products in the post-catalytic combustion zone.

Accordingly, it is a primary object of the present invention to provide a novel and improved combustor and methods of operation which yield very low emissions of air pollutants, particular oxides of nitrogen, while operating in an advanced high-efficiency gas turbine at high load.

BEST MODE FOR CARRYING OUT THE INVENTION

As well known, a gas turbine includes a compressor section, a combustion section and a turbine section. The compressor section is driven by the turbine section through a common shaft connection. The combustion section typically includes a circular array of a plurality of circumferentially spaced combustors. A fuel/air mixture is burned in each combustor to produce the hot energetic flow of gas which flows through a transition piece for flowing the gas to the turbine blades of the turbine section. Thus, for purposes of the present description, only one combustor is illustrated, it being appreciated that all of the other combustors arranged about the turbine are substantially identical to the illustrated combustor.

Figure 1:
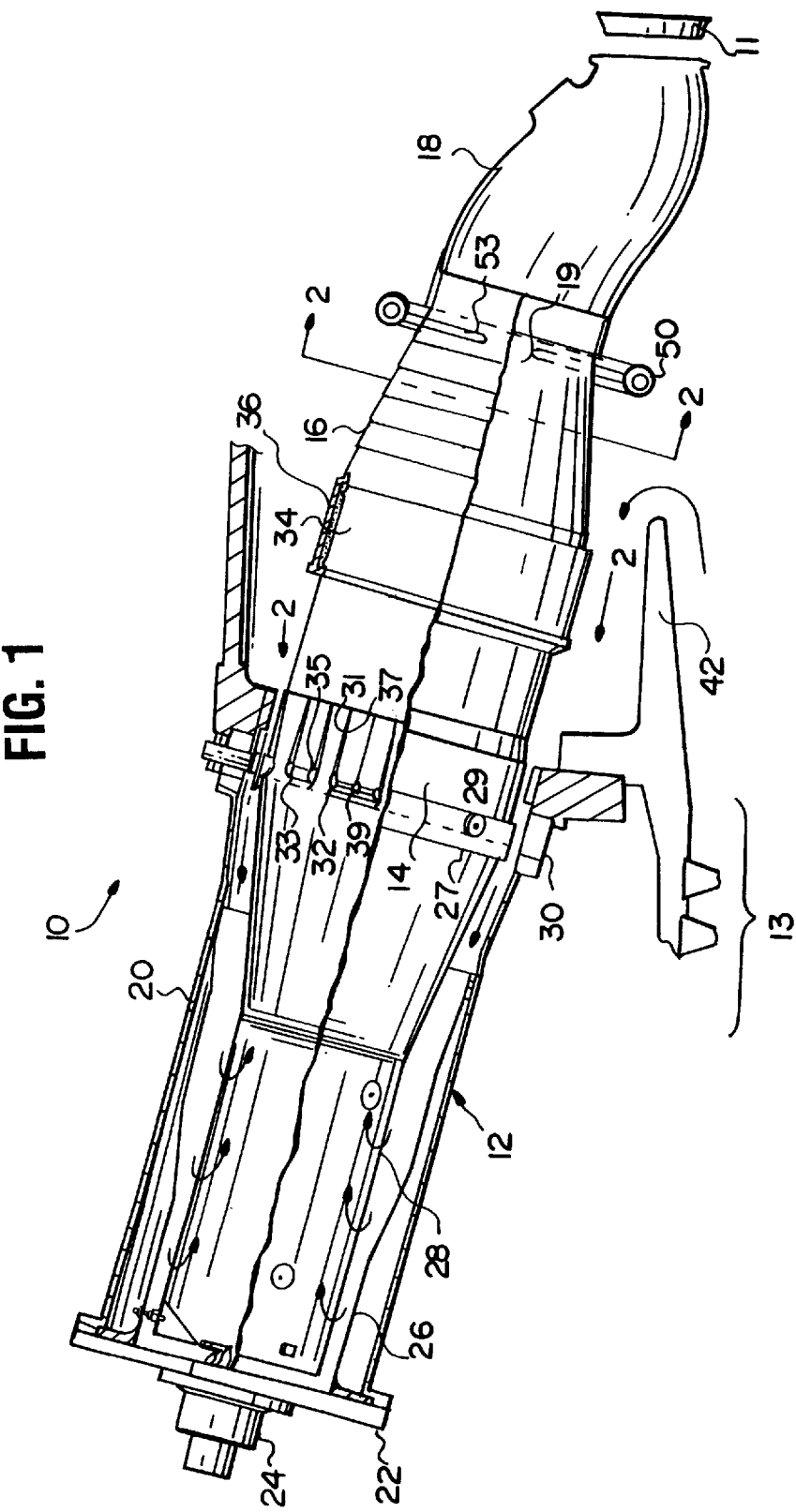
FIG. 1 is a schematic cross-sectional illustration of a combustor forming part of a gas turbine and constructed in accordance with the present invention.
Figure 2:
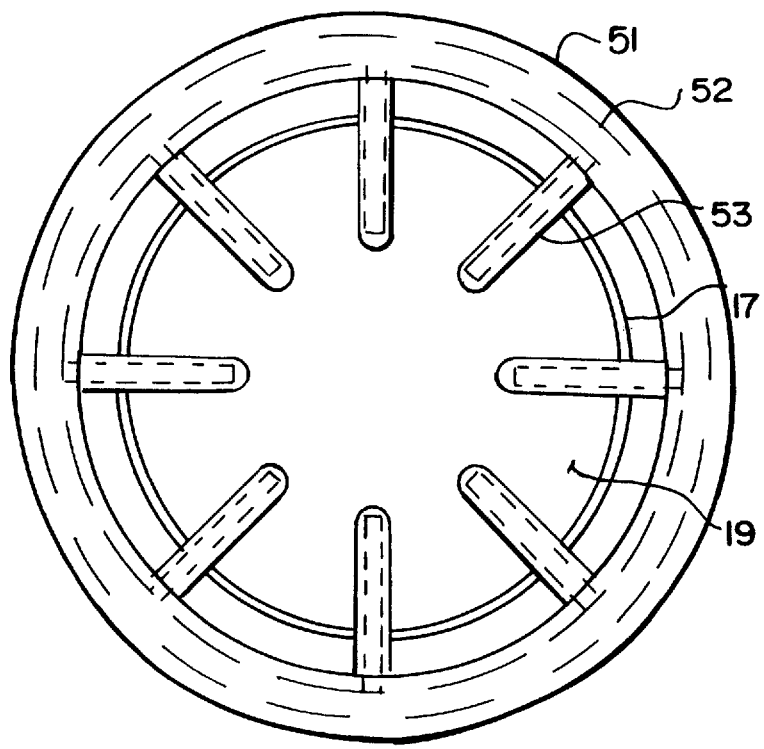
FIG. 2 is a cross-sectional view thereof taken generally about on line 2—2 in FIG. 1.

Referring now to FIG. 1, there is illustrated a combustor, generally designated 10, for a gas turbine having a housing and including a preburner section 12, a fuel/air preparation assembly 14, a catalytic reactor assembly 34, a main combustion assembly 16 and a transition piece 18 for flowing hot gases of combustion to the turbine section, a first stage of the turbine section being illustrated figuratively by a single blade 11. The compressor section is also schematically illustrated at 13 with its discharge case 42 and compressor blades 13. The preburner assembly 12 includes a preburner casing 20, an end cover 22, a start-up fuel nozzle 24, a flow sleeve 26 and a preburner combustion liner 28 within sleeve 26. An ignition device, not shown, is provided and may comprise an electrically energized spark plug. Combustion in the preburner assembly 12 occurs within the preburner combustion liner 28. Preburner combustion air, i.e., a portion of the compressor discharge air, is directed within liner 28 via flow sleeve 26 and enters the preburner combustion liner 28 through a plurality of holes formed in the liner. The air enters the liner under a pressure differential across liner 28 and mixes with fuel from fuel nozzle 24 within liner 28. Consequently, a diffusion flame combustion reaction occurs within the diffusion flame combustion zone within liner 28, releasing heat for purposes of driving the gas turbine.

A catalytic combustion zone includes the fuel/air preparation section 14 and a reactor assembly 34. In that zone, there is provided an annular support ring 30 which supplies hydrocarbon fuel to an injector 32. For example, this might take the form of the multiple venturi tube gas fuel injector described and illustrated in U.S. Pat. No. 4,845,952, the disclosure of which is incorporated herein by reference. Briefly, the venturi tube gas fuel injector includes upstream and downstream header plates 27 and 29 with discrete venturi tubes 31 disposed between the header plates 27 and 29 and projecting in a downstream direction. Each venturi tube includes an inlet section 33 of decreasing cross-section, a throat 35 and a diffuser section 37. The walls forming the venturi tubes are provided with orifices 39 at the throats 35 for communicating fuel gas from the plenum defined between header plates 27 and 29 into the venturi tubes. The advantages and operation of the venturi tubes are set forth in U.S. Pat. No. 4,845,952 referenced above. Suffice to say that the lean mixture of the fuel inlet to the venturi tubes through the orifices and the combustion products from the diffuser flame combustion zone or from the compressor discharge flow downstream at substantially uniform velocity and mixture across the flow stream and enter the catalytic reactor bed 34 via the catalytic reactor assembly liner 36.

The catalytic reactor bed 34 is generally cylindrical in shape and may be formed from a ceramic or high temperature metal super alloy material or a substrate of honeycombed cells coated with a reaction catalyst on their surfaces. The reaction catalyst may, for example, comprise palladium or platinum. The structure of the catalytic reactor bed 34 may be as described and illustrated in U.S. Pat. No. 4,794,753, the disclosure of which is incorporated herein by reference. Thus, the mixture of fuel and preburner products of combustion or compressor discharge air ignites in the presence of the combustion catalyst at preburner discharge temperature. The fuel/air mixture entering the catalytic reactor bed 34 is very lean and the hydrocarbon fuel oxidation reactions go to completion in the reaction zone within the main combustion assembly 16.

Figure 3:
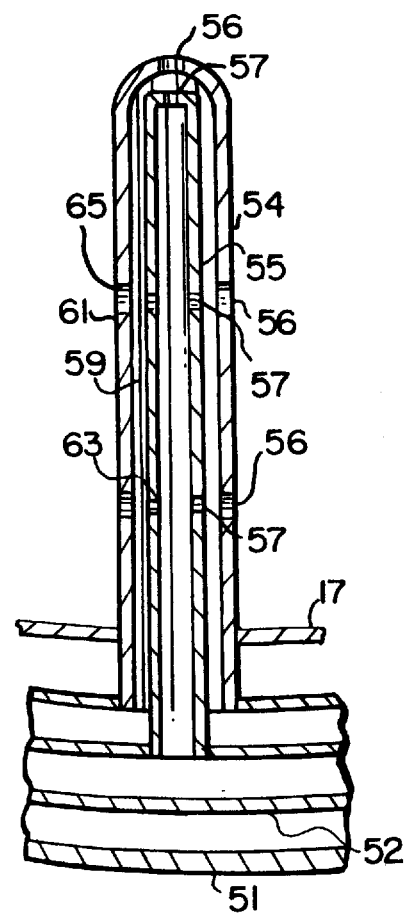
FIG. 3 is an enlarged fragmentary cross-sectional view illustrating the fuel and air manifold for the lean direct injection system shown in FIG. 2.
Figure 4:
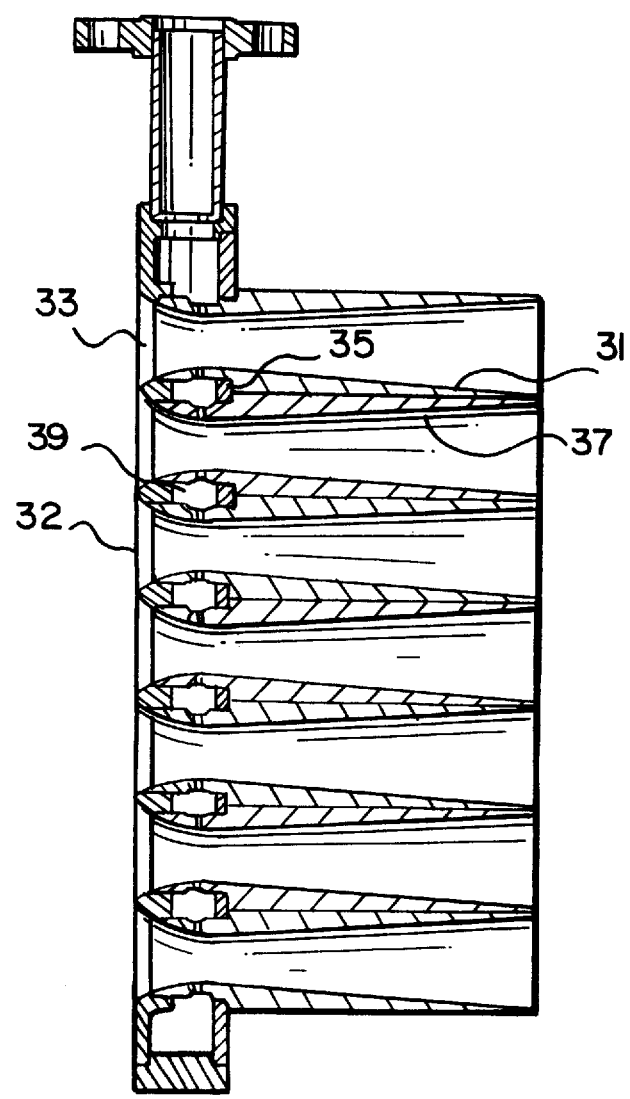
FIG. 4 is a cross-sectional view illustrating the multiple venturi tube fuel injector upstream of the catalytic combustion zone.

For operating at high-load conditions for the gas turbine, there is provided a secondary fuel injector 50 comprised of an air manifold 51, a fuel manifold 52, and a plurality of fuel/air injection spokes 53 which penetrate the post-catalyst combustion liner 17 and introduce additional fuel and air into the post-catalyst reaction zone 19 within the main combustion assembly 16. This secondary fuel/air mixture is ignited by the hot products of combustion flowing downstream from and exiting the main combustion assembly 16. The resulting secondary hydrocarbon fuel oxidation reactions go to completion in the transition piece 18. The secondary fuel is injected into the secondary air via a plurality of fuel orifices 57 and the combination of secondary fuel and secondary air is injected into the post-catalytic reaction zone 19 via a plurality of air orifices 56, in each fuel/air injection spoke 53. More specifically, the fuel/air injection spokes 53 are circumferentially spaced one from the other and project radially inwardly from the liner 16 and from an external manifold which preferably combines the air and fuel manifolds 51 and 52, forming an annular ring about the combustion assembly 16. As illustrated in FIG. 3, each spoke 53 includes an inner tube 59 and an outer tube 61. The inner tube lies in communication with the annular fuel manifold 52 and has a plurality of orifices 63 spaced radially relative to the assembly 16 and along the inner tube 59. Similarly, the outer tube 61 has a plurality of orifices 65 spaced radially relative to assembly 16 and along outer tube 65 in registry with the orifices 63. Consequently, the air and fuel is mixed as it is ejected into the flow of combustion products. The fuel/air mixture in the post-catalytic reaction zone 19 and transition piece 18, which is composed of products of combustion from the main combustion assembly 16 and the fuel/air mixture from the secondary fuel injector 50, is lean.

In operation of the gas turbine, there are three distinct operating modes depending upon the load range on the gas turbine. The first operating mode is at low turbine loads and during initial start-up. In this mode, hydrocarbon fuel is supplied to start-up fuel nozzle 24 and preburner combustion air is provided to liner 28 through the plurality of liner openings for mixing with the fuel from the start-up fuel nozzle. A diffusion flame combustion reaction occurs within the preburner combustion liner 28 which is initiated by an electrically energized spark plug.

At mid-range operating conditions, hydrocarbon fuel is supplied to injector 32. The injector 32 mixes the hydrocarbon fuel with the preburner products of combustion from the diffusion flame combustion zone and this mixture enters the catalytic reactor bed 34 via the catalytic reactor assembly liner 36. The mixture of fuel and preburner products of combustion ignites in the presence of the combustion catalyst. Once the combustion reaction has been initiated, the preburner reaction may be reduced to a low level as needed to sustain the catalytic reaction or shut down entirely when compressor discharge air temperature is sufficient to sustain the catalytic reaction. Because the fuel/air mixture entering the catalytic reactor bed 34 is lean, the combustion reaction temperature is too low to produce the thermal $NO_x$. The hydrocarbon fuel oxidation reactions go to completion in the reaction zone within the main combustion assembly section 16. Thus, during mid-range load conditions, the temperature of the combustion reaction is too low to produce thermal $NO_x$.

Under high-load conditions, catalytic combustion is carried on as described above. Additionally, hydrocarbon fuel and air are supplied to the secondary injector 50. Injector 50 introduces secondary fuel and air into the post-catalyst reaction zone 19 where auto-ignition occurs due to the high temperatures existing in the main combustion assembly section 16 at mid-load and high-load conditions. The secondary hydrocarbon fuel oxidation reactions go to completion in the transition piece 18. Because the secondary fuel/air mixture entering the transition piece 18 is lean, the combustion reaction temperature is lower than the stoichiometric flame temperature and the thermal $NO_x$ formation rate is low. Since the residence time in the transition piece 18 is short and the thermal $NO_x$ formation rate is low, very little thermal $NO_x$ is formed during secondary fuel combustion.

Consequently, it will be appreciated that $NO_x$ emissions are substantially minimized or eliminated through the mid-load and high-load operating ranges of highfiring temperature/high efficiency heavy-duty industrial gas turbines. This has been accomplished simply and efficiently by using catalytic combustion, used as the main combustion system, and lean direct fuel injection, used as the secondary combustion system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor for an industrial gas turbine, comprising: a combustor housing for combusting fuel and confining a stream of combustion products for flow in a downstream direction, said combustion housing having (i) a diffusion flame combustion zone including a fuel nozzle for introducing fuel into said zone and air admission openings for introducing air into the zone; (ii) a catalytic combustion zone downstream of the diffusion flame combustion zone and including a catalytic reactor bed and a fuel inlet for supplying fuel thereto; (iii) a post-catalytic combustion zone downstream of said catalytic combustion zone including in said post-catalytic combustion zone a nozzle for flowing a fuel/air mixture into said post-catalytic combustion zone; and (iv) a transition piece downstream of said post-catalytic combustion zone between said post-catalytic combustion zone and a first stage of the gas turbine and in which transition piece secondary fuel oxidation reactions go to completion without substantial formation of $NO_x$ due to short residence time in said transition piece.

2. A combustor according to claim 1 wherein said post-catalytic combustion zone is encompassed by a liner, said nozzle for flow of fuel/air mixture into said post-catalytic combustion zone including a plurality of fuel and air orifices disposed to flow the fuel/air mixture into the post-catalytic combustion zone, said orifices being spaced inwardly of said liner.

3. A combustor according to claim 1 wherein said nozzle for flowing fuel/air mixture into said post-catalytic combustion zone includes a plurality of spokes extending inwardly of said housing and having a plurality of fuel and air orifices disposed to flow the fuel/air mixture into the post-catalytic combustion zone.

4. A combustor according to claim 1 wherein said fuel inlet for the catalytic reactor bed is disposed upstream thereof.

5. A combustor according to claim 4 wherein said fuel inlet for the catalytic reactor bed includes a plurality of venturi tubes disposed in said housing, each said tube having a wall defining a throat and an orifice through the wall of the throat and means for flowing fuel through said orifices into the flow stream through the venturi tubes.

6. A combustor according to claim 1 wherein said post-catalytic combustion zone is encompassed by a liner, said nozzle for flow of fuel/air mixture into said post-catalytic combustion zone including a plurality of fuel and air orifices disposed to flow the fuel/air mixture into the post-catalytic combustion zone, said orifices being spaced inwardly of said liner, said fuel inlet for the catalytic reactor bed being disposed upstream thereof.

7. A combustor according to claim 6 wherein said fuel inlet for the catalytic reactor bed includes a plurality of venturi tubes disposed in said housing, each said tube having a wall defining a throat and an orifice through the wall of the throat and means for flowing fuel through said orifices into the flow stream through the venturi tubes.

* * * * *